INVENTOR.
R.C. HARRISON
BY Young & Quigg
ATTORNEYS

Oct. 11, 1966  R. C. HARRISON  3,278,665
METHOD FOR FORMING HOLLOW PLASTIC ARTICLES
Filed Jan. 3, 1963  2 Sheets-Sheet 2

INVENTOR.
R.C. HARRISON
BY Young & Quigg
ATTORNEYS

United States Patent Office

3,278,665
Patented Oct. 11, 1966

3,278,665
METHOD FOR FORMING HOLLOW PLASTIC ARTICLES
Roy C. Harrison, Bartlesville, Okla., assignor to Phillips Petroleum Company, a corporation of Delaware
Filed Jan. 3, 1963, Ser. No. 249,217
2 Claims. (Cl. 264—98)

This invention relates to a method for forming hollow plastic articles. In another aspect, it relates to a method for extrusion molding of hollow articles, such as bottles, from thermoplastics, such as polyethylene.

The manufacure of hollow plastic articles, such as bottles and other containers, is becoming increasingly widespread and important. One widely used method of making these articles is by the continuous extrusion and cyclic blow molding of thermoplastics such as polyethylene. According to this method, a hollow tube or parison of the thermoplastic is extruded, one end of the tubing is closed, fluid pressure such as compressed air is introduced into the open end of the tubing to expand the same into contact with the cooled walls of a mold, and the mold is opened to release the resulting hollow article. Though this method is generally satisfactory, in many instances the hollow articles do not have the physical properties desired, such as high tensile strength, clarity, and uniform wall thickness.

Accordingly, an object of this invention is to improve the formation of hollow plastic articles. Another object is to provide an improved method for forming hollow articles from thermoplastics, such as polyethylene, with improved physical properties, such as high tensile strength, clarity, uniform wall thickness, etc. Further objects and advantages of this invention will become apparent to those skilled in the art from the following discussion, appended claims, and accompanying drawing in which:

According to this invention, a tubing or parison of thermoplastic material is extruded from an annular orifice of a die, one end of the tubing is sealed, expansible compression means is inserted into the tubing through the open end thereof, the tubing is then expanded within the temperature-controlled walls of a mold by expansion of said means and/or admission of fluid pressure through said open end, said means is expanded and caused to exert mechanical compressive force on the walls of said expanded tubing, after which said means is withdrawn from the resulting expanded article, and the mold opened to release the same. In the preferred embodiment of this invention, the expansible compression means comprises a radially expansible and collapsible set of rollers or the like, which means is collapsed and introduced into the open end of the tubing and thereafter radially expanded into contact with the tubing, and said means is longitudinally moved within the tubing and rotated therein so as to cause the rollers to effect mechanical working of the walls of the expanded plastic article by exertion of compressive force thereon, after which said means is collapsed and withdrawn from the open end of the article.

This invention can be used to mold various articles, particularly containers such as bottles, buckets, wastebaskets, etc., from a variety of thermoplastic materials such as polyethylene, polypropylene, polystyrene, polyvinylchloride, etc. Especially useful thermoplastic are Marlex<sup>R</sup> olefin polymers such as polyethylenes and ethylene copolymers. The special apparatus needed in this invention to form such articles can be used in combination with conventional molding equipment, particularly that usually employed in blow molding.

Figures 1, 2:
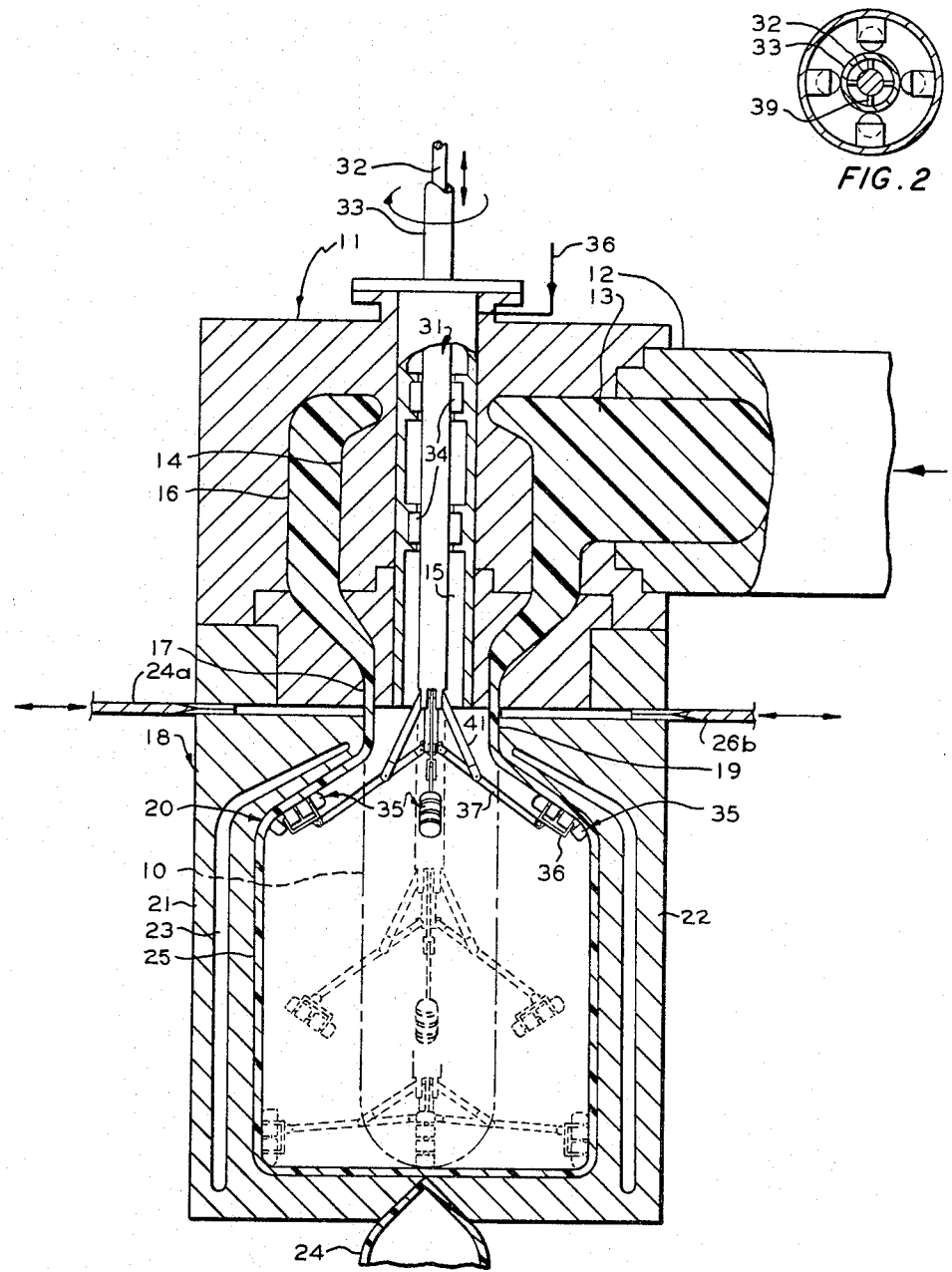
FIGURE 1 is an elevational view in cross section of an extrusion die and mold with an embodiment of this invention associated therewith.
FIGURES 2, 3, 4 and 5 are isometric views of portions of the apparatus shown in FIGURE 1.

Referring now to the drawing, in which like parts have been designated with like reference numerals, and initially to the preferred embodiment of FIGURES 1 to 5, there is shown a die head 11 which is connected by means of conduit 12 to a conventional extruder or injection molding machine (not shown) which supplies the die head with a stream 13 of molten thermoplastic. Die head 11 is provided with a mandrel 14 disposed within a bore 16 which communicates with conduit 12. Bore 16 and mandrel 14 terminate at their lower ends to provide an orifice 17 at the lower end of the die head 11 for the extrusion of a parison shown by broken lines 10. Disposed below die head 11 is a conventional mold 18, the particular mold shown benig that for the fabrication of a bottle 20 having a neck portion 19 and body portion 25. The mold 18 is preferably made in two halves 21, 22 and is shown in FIGURE 1 in its closed position, means for opening and closing such molds being well known in the art. The mold halves 21, 22 can be provided with one or more internal channels 23 for circulation of heat exchange media, such as water. The abutting portions of the lower ends of mold halves 21, 22 form a means for pinching off and sealing the lower end of the parison 10 which is extruded from die head 11, the pinched off residue being designated 24. A pair of complementary knives 24a, 26b is disposed between the lower face of die head 11 and the top of mold 18, and these knives can be actuated by any suitable means, such as a piston or the like, to cut off or sever the top of the bottle after it has been formed and is ready for release from the mold. Any other suitable means to pinch off the lower tubing and thereafter sever the top of the molded article can be used.

According to this invention, there is mounted within a bore 15 of mandrel 14 a longitudinally moveable, rotatable, radially expansible compression means 31, which can be inserted into and withdrawn from the mouth or open end of the mold 18. Said means 31 comprises a rotatable, longitudinally moveable rod 32 which is surrounded by a rotatable, longitudinally moveable tubular member 33, the rod and tubing being rotatable together and relatively longitudinally moveable with respect to each other. The movement and rotation of means 31 can be accomplished by hand, but preferably by any suitable automatic motive source in a cyclic operation. Means 31 can be surrounded by one or more roller bearings 34 or the like, such as shown in FIGURE 2. A plurality of circumferentially spaced, segmented rollers 35 (shown clearly in FIGURE 3) are attached to yokes 36, each of which in turn is pivotally attached near one end to one end of a radially expansible arm 37 that is attached by a suitable yoke 38 and lug 39 (see FIGURE 4) to the lower end of rod 32. Each of arms 37 are pivotally fastened at an intermediate portion thereof to the flanged outer end of an arm 41, the upper end of which is connected by a pivotal pin to the lower end of tubing 33 (see FIGURE 5). Compressed air or other fluid pressure can be supplied to bore 15 by conduit means 36 or the like.

Rollers 35 are shown in FIGURE 1 in the position they occupy when they are mechanically working the upper wall of bottle 20. The position of the rollers 35 when expanded within but out of contact with bottle 20 will be like that shown by the broken lines in the middle of the bottle, with arms 37 expanded and the rollers pivotally suspended, each yoke 36 being pivotally connected off-center to the corresponding end of an arm 37. Rollers 35 are preferably made in segments (shown clearly in FIGURE 3) with a flexible axle (e.g., made of a spring or a plastic such as Teflon polytetrafluoroethylene) to ensure contact of the rollers with corners in the bottle. Rollers 35 can also be made of such a plastic, or can be made of metal.

In operation, thermoplastic material, e.g., an ethylene-butene copolymer having a density of 0.950, is supplied, e.g., at 350–450° F., and is extruded from die head 11 in the form of a parison which has the shape shown by broken line 10. Mold halves 21, 22 thereafter close, shearing off and sealing the lower portion of tubing 10. Following extrusion of tubing 10, the latter is expanded within the closed mold 18, which is cooled by circulation of tap water. This expansion can be accomplished by the admission of compressed air (e.g., 10 to 70 p.s.i.g.) or other fluid pressure supplied by conduit 36 to bore 15 into the open end or neck 19 or tubing 10, the fluid pressure causing the tubing to expand. The tubing 10 can be initially expanded in contact with the walls of mold 18, but preferably is expanded so that it is quite close to the walls of the mold but not in contact therewith. Expansion of the tubing causes it to take the shape 20 shown in FIGURE 1. Following expansion of tubing 10 against or in close proximity to the walls of the mold 18, means 31 is inserted in its collapsed condition through the mouth of the expanded tubing, and such means is thereafter expanded by moving rod 32 further downward with respect to member 33 such that rollers 35 come into contact with the inner surface of the expanded article. Where the expanded article is out of contact with the walls of the mold, the mechanical working of the inner wall of the article causes it to further expand into contact with the walls of the mold.

There are several ways of mechanically working the walls of the expanded article. One way is to expand the roller means into contact with the bottom of the expanded article and after working the bottom to then work the side walls; alternatively, the walls can be worked first and then the bottom of the article. Preferably, the roller means are lowered within the bottle near the bottom thereof, the rollers are expanded gradually and the bottom of the article is rolled from the center outward, then the roller means is elevated in its expanded position to roll the side wall of the expanded article. The broken lines within the bottle in FIGURE 1 show several positions of the expanded roller means. During the working of the thermoplastic, the whole roller means 31 is rotated as a unit. After completing the rolling operation, means 31 can be collapsed by drawing the same upwardly through the mouth of the article. Thereafter, knives 26a, 26b can be actuated to shear the molded article from the lower face of the die head 11, and mold halves 21, 22 parted to release the molded article; such release can be aided by a blast of compressed air. Thereafter, the operation can be repeated in a cyclic manner to form another hollow plastic article. The hollow plastic article can be trimmed as desired, or otherwise finished in a conventional manner.

The mechanical working of the bottle preferably takes place when the thermoplastic is in its partially crystallized state, i.e., before the molecules of the thermoplastic have become permanently oriented. The mechanical working of the thermoplastic compresses and expands the thermoplastic somewhat, thereby ensuring the desired orientation (e.g., biaxial orientation) and improving the physical properties of the bottle.

Figures 6, 7:
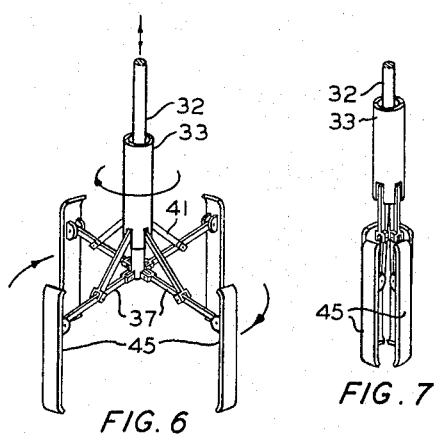
FIGURES 6 and 7 are isometric views of some modifications which can be made in the apparatus shown in FIGURES 1–4.

In FIGURES 6 and 7, I have shown a modification of the means 31 shown in FIGURES 1–5. In such modification, instead of using rollers I can employ curved members 45. It should be obvious that other working members with suitable curved surfaces could be used.

Figure 8:
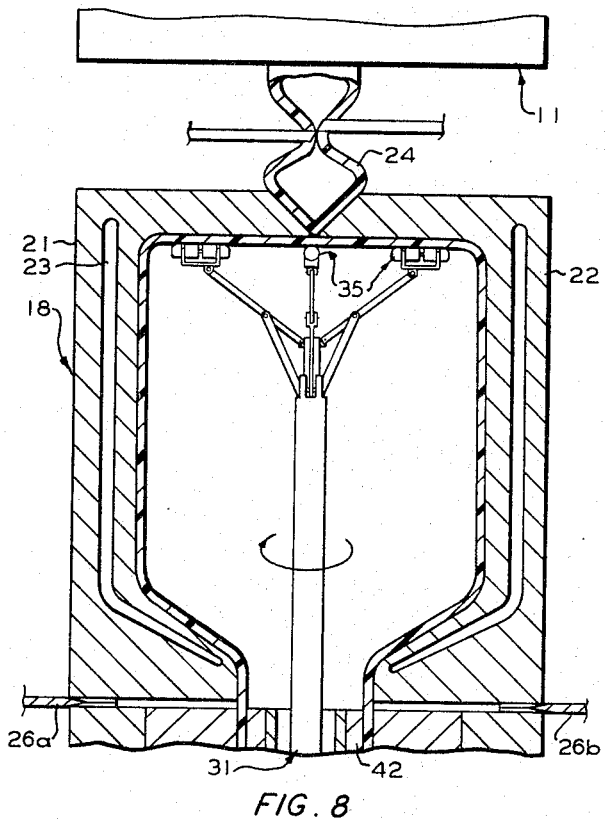
FIGURE 8 is an elevational cross section view similar to that of FIGURE 1 showing another embodiment of this invention.
Figure 5:
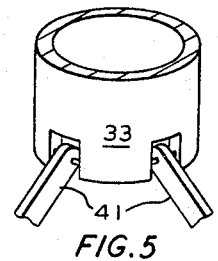
Figure 4:
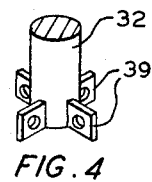
Figure 3:
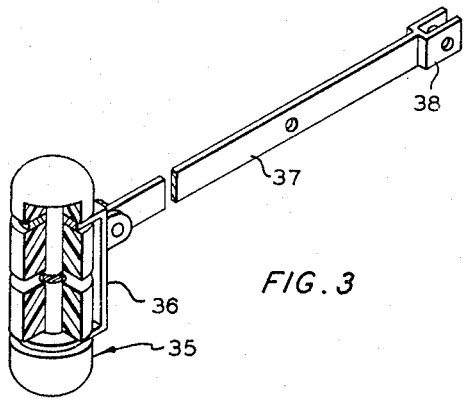

Referring now to the embodiment shown in FIGURE 8, mold 18 is shown in its inverted position relative to die head 11. In this modification, tubing is extruded between mold halves 21, 22, which are thereafter closed, pinching off the upper end of the tubing and the tubing in the mold is severed above the mold leaving the severed ends open. If required, the mold can be moved axially during the severing step, in a manner known in the art, to insure the reopening of the severed ends. A blow head 42 is inserted within the lower open end of the tubing; the lower end of mold 18 can be provided with a bevel opening to receive the blow head. Thereafter, the tubing within the mold is expanded and the walls thereof subjected to compressive force by means 31, in the manner described above. Note that in this embodiment I have shown the rollers 35 in the position they would occupy in mechanically working the bottom of the bottle. Other portions of the bottle can be worked like that described above in connection with FIGURE 1.

Various modifications and alterations of this invention will become apparent to those skilled in the art without departing from the scope and spirit of this invention, and it should be understood that this invention is not to be limited unduly to that set forth herein for illustrative purposes.

I claim:

1. The method of forming hollow articles having a uniform wall thickness from molten thermoplastic, which comprises the steps of extruding a tubing of said thermoplastic; closing one end of said tubing; partially expanding said tubing in a mold to form a single-walled expanded article having an opening therein; inserting through said opening means for mechanically working the wall of the partially expanded article; simultaneously mechanically working and further expanding the inner wall of the partially expanded tubing thereby causing it to expand into contact with the walls of the said mold and removing the resulting expanded article from said mold.

2. The method of forming hollow articles having a uniform wall thickness from molten thermoplastic, which comprises the steps of extruding a tubing of said thermoplastic; closing a mold about said tubing; severing one end of said tubing; partially expanding said tubing within said mold into proximity with the walls thereof to form a single-walled partially expanded article having an opening; inserting through said opening means for mechanically working the wall of the partially expanded article; simultaneously mechanically working and further expanding the inner wall of the partially expanded article by application of compressive force on the inner wall of said tubing thereby causing it to expand into contact with the wall of said mold; severing said expanded tubing from said thermoplastic and removing the resulting expanded article from said mold.

References Cited by the Examiner

UNITED STATES PATENTS

| | | | |
|---|---|---|---|
| 1,554,853 | 9/1925 | Hodecker | 65—79 |
| 2,372,177 | 3/1945 | Conner | 264—328 |
| 2,787,023 | 4/1957 | Hagen et al. | 264—98 |
| 2,810,934 | 10/1957 | Bailey | 264—98 |
| 2,861,295 | 11/1958 | Hagen et al. | |
| 2,890,483 | 6/1959 | Soubier. | |
| 3,089,187 | 5/1963 | Wolfe | 18—14 |

FOREIGN PATENTS

| | | |
|---|---|---|
| 1,288,393 | 2/1962 | France. |
| 481,588 | 3/1938 | Great Britain. |
| 401,592 | 9/1924 | Germany. |
| 836,463 | 4/1952 | Germany. |

ROBERT F. WHITE, *Primary Examiner.*

MORRIS LIEBMAN, *Examiner.*

C. B. HAMBURG, A. R. NOE, *Assistant Examiners.*